(12) United States Patent
Yuan (10) Patent No.: US 10,015,558 B2
(45) Date of Patent: Jul. 3, 2018

(54) METHOD AND DEVICE FOR ADJUSTING TELEVISION NOTIFICATION DISPLAY DURATIONS AND TELEVISION

(71) Applicants: HISENSE ELECTRIC CO., LTD., Qingdao (CN); HISENSE USA CORPORATION, Suwanee, GA (US); HISENSE INTERNATIONAL CO., LTD., Qingdao (CN)

(72) Inventor: Yanmei Yuan, Qingdao (CN)

(73) Assignees: HISENSE ELECTRIC CO., LTD., Shandong (CN); HISENSE USA CORPORATION GA (US); HISENSE INTERNATIONAL CO., LTD., Shandong (CN)

( * ) Notice: Subject to any disclaimer, the term of this patent is extended or adjusted under 35 U.S.C. 154(b) by 0 days.

(21) Appl. No.: 15/394,723

(22) Filed: Dec. 29, 2016

(65) Prior Publication Data

US 2017/0374428 A1    Dec. 28, 2017

(30) Foreign Application Priority Data

Jun. 28, 2016    (CN) .......................... 2016 1 0495866

(51) Int. Cl.
*H04N 21/431*    (2011.01)
*H04N 21/488*    (2011.01)
*H04N 21/61*    (2011.01)

(52) U.S. Cl.
CPC ..... *H04N 21/4882* (2013.01); *H04N 21/6125* (2013.01)

(58) Field of Classification Search
CPC .................................................... H04N 21/431
USPC ............................................................. 725/52
See application file for complete search history.

(56) References Cited

U.S. PATENT DOCUMENTS

| | | | | |
|---|---|---|---|---|
| 6,018,372 A | * | 1/2000 | Etheredge | .......... H04N 5/44543 348/E5.105 |
| 2002/0015107 A1 | * | 2/2002 | Ivehammar | ............ H04N 5/445 348/468 |

* cited by examiner

*Primary Examiner* — Dominic D Saltarelli
(74) *Attorney, Agent, or Firm* — J.C. Patents (57) ABSTRACT

Embodiments of the present application provide a method and a device for adjusting television notification display durations and a television, the method includes: receiving notification information sent by a server, and determining a first display duration according to a notification type of the notification information; receiving an operation instruction sent by a user regarding the notification information; adjusting the first display duration to a second display duration according to a type of the operation instruction. The method and device for adjusting television notification display durations, and the television provided by the embodiments of the present application can adjust the display durations of notifications according to level of user interest towards the certain type of notifications, thus improving user experience.

17 Claims, 5 Drawing Sheets

METHOD AND DEVICE FOR ADJUSTING TELEVISION NOTIFICATION DISPLAY DURATIONS AND TELEVISION

CROSS REFERENCE TO RELATING APPLICATIONS

The present application claims the priority of Chinese Patent Application No. 201610495866.3, filed on Jun. 28, 2016, entitled "Method and Device for Adjusting Television Notification Display Durations and Television System", the content of which is incorporated by reference in its entirety.

TECHNICAL FIELD

The present application relates to the television field, and particularly to a method and a device for adjusting television notification display durations and a television.

BACKGROUND

In the field of smart televisions, a great variety of applications, such as video applications, user installed applications, system built-in applications or physical signal source, etc. run on the television. When the applications are running on the television, notifications of all types tend to be pushed by the applications, such as, system application notifications, background-recommended notifications, physical signal source-associated notifications, etc., and the notifications are displayed on the television screen. According to the notifications displayed on the television screen, a user can be informed of basic contents of the notifications.

In relevant technologies, the display time of notifications of different types are typically preset according to an empiric value, and display durations of the same type of notifications are equal. When the notification display time reaches a preset display duration, the notification will disappear automatically. If interested in a displayed notification, the user can check specific contents of the notification when the notification is displayed by inputting contents of a notification-checking instruction. If not interested in a currently displayed notification, the user can wait for the notification to disappear automatically, or cancel display of the notification via inputting a notification-cancellation instruction into a remote controller. However, the display time of the same type of notifications is fixed in relevant technologies.

SUMMARY

Embodiments of the present application provide a method and a device for adjusting television notification display durations and a television.

In a first aspect, an embodiment of the present application provides a method for adjusting television notification display durations, including:

receiving notification information sent by a server, and determining a first display duration according to a notification type of the notification information;

receiving an operation instruction sent by a user regarding the notification information;

adjusting the first display duration to a second display duration according to the type of the operation instruction.

In a second aspect, an embodiment of the present application provides a device for adjusting television notification display durations, including a memory, a communication port and a processor, wherein, the memory is configured to store instructions, the processor is coupled with the memory and is configured to execute the instructions stored on the memory, and the processor is configured to:

receive notification information sent by a server via the communication port, and determine a first display duration according to a notification type of the notification information;

receive an operation instruction sent by a user regarding the notification information;

adjusting the first display duration to a second display duration according to the type of the operation instruction.

In a third aspect, an embodiment of the present application provides a television, which includes the above device for adjusting television notification display durations.

BRIEF DESCRIPTION OF THE DRAWINGS

In order to make a clearer description of technical solutions in embodiments of the present application or in relevant technologies, the drawings required for describing the embodiments or the relevant technologies as follows will be briefed. Apparently, the drawings described hereafter are just some embodiments of the present application, and for one with ordinary skill in the art, other drawings can also be acquired in accordance with these drawings without delivering creative efforts.

DESCRIPTION OF EMBODIMENTS

In order to render a clearer description of the purpose, technical solutions and advantages of embodiments of the present application, the technical solutions in the embodiments of the present application will be described clearly and completely as follows in conjunction with drawings accompanying the embodiments of the present application. And apparently, the described embodiments are just part rather than all of the embodiments of the present application. All the other embodiments acquired by one with ordinary skill in the art based on the embodiments of the present application without delivering creative efforts shall fall into the protection scope claimed by the present application.

A method and a device for adjusting television notification display durations, and a television provided by the embodiments of the present application are configured to adjust display durations of this type of notifications on a television screen according to the level of interest of a user toward a notification type displayed on a television, in which the display duration of a notification with a notification type the user is concerned for is lengthened, while the display duration of a notification with a notification type the user isn't concerned for is shortened, so that the display duration of the notification is more in line with demand of the user.

Figure 1:
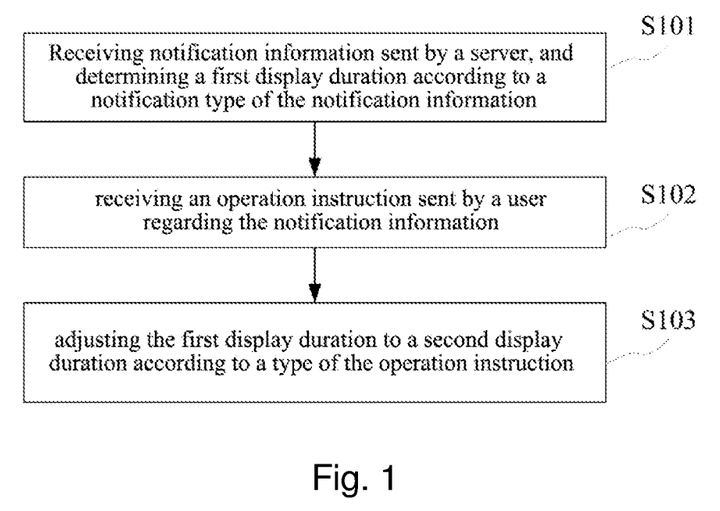
FIG. 1 is a flow diagram 1 of a method for adjusting television notification display durations in an embodiment of the present application.
Figure 2:
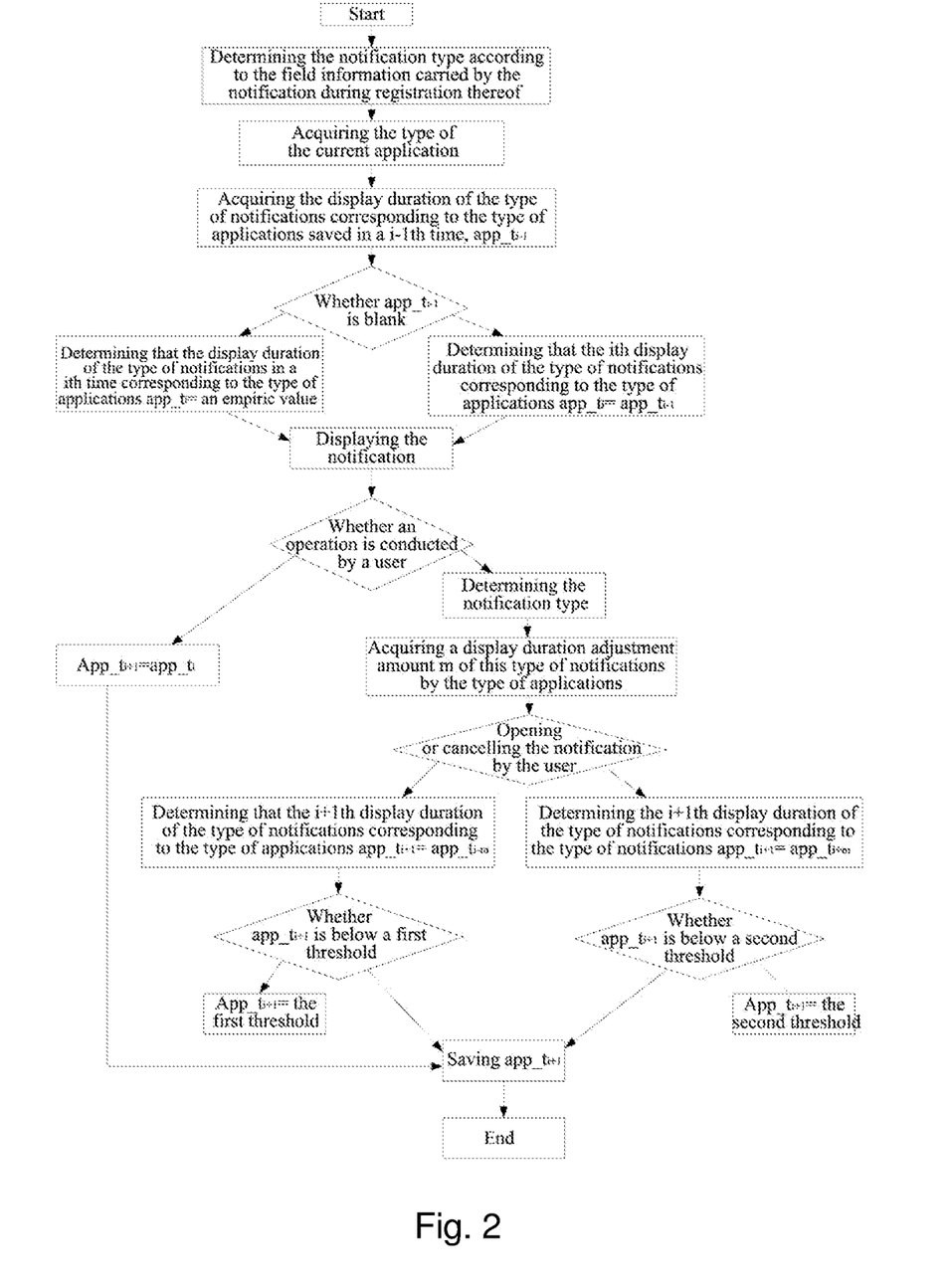
FIG. 2 is a flow diagram 2 of a method for adjusting television notification display durations in an embodiment of the present application.

FIG. 1 is a flow diagram 1 of a method for adjusting television notification display durations in an embodiment of the present application. FIG. 2 is a flow diagram 2 of a method for adjusting television notification display durations in an embodiment of the present application.

In reference to FIG. 1 or FIG. 2, a method for adjusting television notification display durations provided by an embodiment of the present application includes:

S101, receiving notification information sent by a server, and determining a first display duration according to a notification type of the notification information.

In the present application, a television may classify notification information sent by a server in advance, for example, the type of the notification information may include system-associated notifications (such as application upgrade information, some new application prompts after upgrading of a system, etc.), notifications recommended in the background (such as brief introduction of television dramas, recommendation of film music, advertisements, etc.), physical signal source-associated notifications (such as program reminders, signal-accessing callmaster), built-in prompt notifications of an application (prompts such as internal function prompts of the application itself, not acquiring data and retrying later and the like) etc. During actual applications, a television can conduct the classifications of the notification information sent by a server as practically needed in a reasonable way, and the present application imposes no specific limits on the type of the notification information classified by the television.

The corresponding relation between the notification type and the display duration may be preset on a television, in practical applications, the corresponding relation may be set as practically needed. After receiving the notification information sent by a server, firstly acquiring the notification type of the notification information, and acquiring a first display duration according to the notification type of the notification information and the corresponding relation, wherein the first display duration is the display duration of the notification information, and the display duration of a type of notifications corresponding to the notification type of the notification information as well.

S102, receiving an operation instruction sent by a user regarding the notification information.

After the notification information is displayed on a television screen according to the first display duration, the user conducts operations to the notification information based on user's needs. For example, assuming the user is interested in the notification information, then the user can choose to further browse contents of the notification information via an input apparatus (such as a remote controller), and at this point the operation instruction inputted by the user is a "opening notification". For example, the user can move the current operation focus to the notification display control through the remote controller, and click an "OK" button on the remote controller. If the user is not interested in the notification information, and thus prefers not to proceed with the browsing process, and the notification information is still there at the moment, then the user can choose to cancel display of the notification information through an input apparatus, when the operation instruction inputted by the user is a "cancelling notification". For example, the user can move the current operation focus to the notification display control through the remote controller, and click a "backspace" button on the remote controller.

S103, adjusting the first display duration to a second display duration according to the type of the operation instruction.

After receiving the operation instruction sent by a user regarding the notification information, acquiring the type of the operation instruction. The type of the operation instruction may include a notification-opening type and a notification-cancellation type. For example, if the operation instruction inputted by the user is an "opening notification", then the type of the operation instruction is the notification-opening type. If the operation instruction inputted by the user is a "cancelling notification", then the type of the operation instruction is the notification-cancellation type.

Adjusting the first display duration to the second display duration according to the type of the operation instruction. When the type of the operation instruction is the notification-opening type, the first display duration may be lengthened, so that the second display duration exceeds the second display duration. When the type of the operation instruction is the notification-cancellation type, the first display duration may be shortened, so that the second display duration is less than the first display duration.

It should be noted that, after adjusting the first display duration to a second display duration, the corresponding relation between the notification type and display duration preset in a television is changed. In the corresponding relation, the first display duration corresponding to the notification type of the notification information sent by a server is adjusted to a second display duration.

In practical applications, during the process of adjusting the first display duration to a second display duration, in a bid to avoid the second display duration being undesirably too long or too short, the upper and lower limits of the second display duration may be constrained, possibly through the following feasible implementations: determining whether the second display duration is less than a first preset threshold, and if so, assigning the first preset threshold as the second display duration. In such a way, it can guarantee that the second display duration at the minimum will not be less than the first preset threshold. Determining whether the second display duration exceeds a second preset threshold, and if so, assigning the second preset threshold as the second display duration. In this way, it can guarantee that the second display duration at the maximum will not exceed the second preset threshold.

It should be noted that, after adjusting the first display duration to the second display duration via the above method, the television displays other notification information according to the second display duration when the television receives once again other notification information with the same notification type as that of the aforementioned notification information.

The method of the embodiment illustrated in FIG. 1 will be detailed as follows through an example.

For example, assume that the corresponding relation between the notification type and the display duration preset in a television is shown in table 1:

TABLE 1

| Notification type | Display duration |
| --- | --- |
| System-associated notification | 1 min |
| Background-recommended notification | 0.5 min |
| Physical signal source-associated notification | 1.5 min |
| ... | ... |

After receiving a program reminder notification sent by a server, firstly acquiring the notification type of the program reminder notification, and assuming that the notification type of the acquired program reminder notification is a physical signal source-associated notification. Then according to the corresponding relation of the notification type shown in table 1, acquiring the first display duration (1.5 min) corresponding to the physical signal source-associated notification, and displaying the program reminder notification on a television screen according to the first display duration.

Assuming that the user is quite interested in the program reminder notification, then the user moves the current operation focus to a display control of the notification information via a remote controller, and clicks an "OK" button on the remote controller, so as to input an "opening notification" instruction. After receiving the "opening notification" instruction inputted by the user, the type of the operation instruction is acquired as a notification-opening one. Then the first display duration (1.5 min) corresponding to the physical signal source-associated notification is lengthened, thus obtaining a second display duration, such as a second display duration which may be 2 min After adjusting the first display duration corresponding to the physical signal source-associated notification to the second display duration, the corresponding relation between the notification type and the display duration preset on the television is altered to a relation shown in table 2:

TABLE 2

| Notification type | Display duration |
| --- | --- |
| System-associated notification | 1 min |
| Background-recommended notification | 0.5 min |
| Physical signal source-associated notification | 2 min |
| ... | ... |

In the method for adjusting television notification display durations provided by the present application, after receiving notification information sent by a server, determining a first display duration according to the notification type of the notification information, and displaying the notification information on a television screen according to the first display duration. After a user sends an operation instruction regarding the notification information, adjusting the first display duration to a second display duration according to the type of the operation instruction. During the process, the type of the operation instruction reflects the level of interest of the user toward the notification information, when the type of the operation instruction indicates that the user is interested in the notification information, the first display duration corresponding to the notification type is lengthened, such that the display duration of this type of notification information is lengthened the next time the television receives notification information of such a notification type; and when the type of the operation instruction indicates that the user is not interested in the notification information, the first display duration corresponding to the notification type is shortened, allowing the display duration of notification information of such type to be shortened the next time the television receives notification information of this notification type. During the above process, the second display duration is a display duration determined as practically needed by the user, so as to avoid, on a television, the display time of a notification the user is not interested in being too long, or the display time of a notification the user is interested in being too short, so as to improve user experience of the television.

Figure 3:
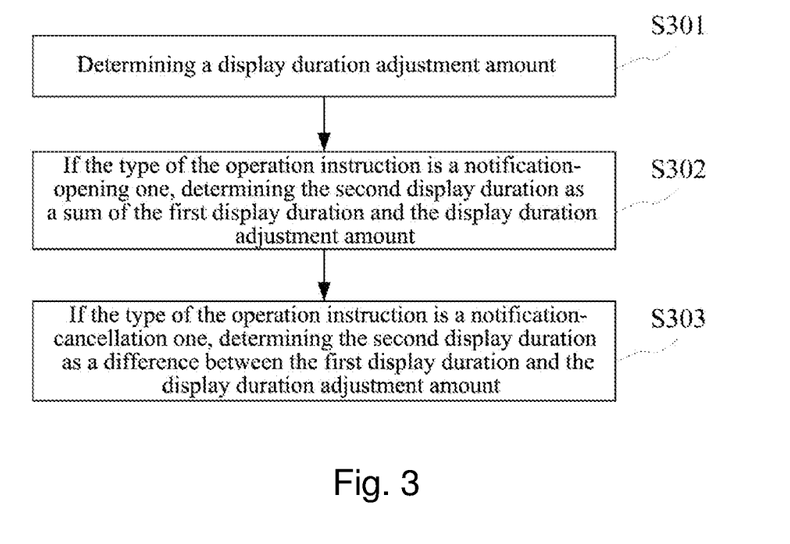
FIG. 3 is a flow diagram of a method for adjusting display durations provided by an embodiment of the present application.

On the basis of the embodiment illustrated in FIG. 1, the first display duration may be adjusted to a second display duration (S103 in the embodiment shown in FIG. 1) according to the type of the operation instruction via the following feasible implementation, for which please refer to the embodiment shown in FIG. 3.

FIG. 3 is a flow diagram of a method for adjusting display durations provided by an embodiment of the present application, in reference to FIG. 3, the method may include:

S301, determining a display duration adjustment amount.

When the first display duration is in need of adjustment, firstly determining a display duration adjustment amount, which may be determined through the following feasible implementations: acquiring an application type of an application currently running on a television, determining a degree of association between the notification information and the application according to the notification type and the application type, and determining the display duration adjustment amount according to the degree of association.

In this feasible implementation, a mapping relation is present among the notification type, the application type and the degree of association, and a mapping relation may also be present between the degree of association and the display duration adjustment amount. The mapping relation may be preset on a television in advance. The degree of association represents the level of interest of a user towards a notification displayed on the application when the application concerned is running, in which the higher the degree of association between the notification information and the application, the larger the display duration adjustment amount; on the contrary, the smaller the display duration adjustment amount. As a result, the display duration adjustment amounts corresponding to notifications of the same type are not exactly the same under different scenarios. Display duration adjustment amounts corresponding to notifications of different types are also not exactly the same under the same scenario.

The degree of association between the notification information and the application reflects the level of interest of a user towards the notification information when the application is running on a television. For example, when a system built-in application is running on a television, the user is more interested in the system level notification, in other words, the degree of association between the system built-in application and a system-level notification is higher. At this moment, the display duration adjustment amount of the system built-in application may be set as a great value; and if what is running on the television presently is a physical signal source, then the display duration adjustment amount of the signal-associated notification, such as a program reminder, call master, etc., may be set as a great value; for another example, when what is running on the television is video-type applications, then those types of notifications such as background-pushed video recommendation, etc., may be provided with a great display duration adjustment amount, which is to say, different display duration adjustment amounts are set for different types of notifications displayed under a scenario where different types of applications are running. A large display duration adjustment amount is set in a case where a high level of interest is present under a certain application scenario, and a smaller one is set in a case where a low level of interest is present.

S302, if the type of the operation instruction is a notification-opening one, determining the second display duration as a sum of the first display duration and the display duration adjustment amount.

S303, if the type of the operation instruction is a notification-cancellation one, determining the second display duration as a difference between the first display duration and the display duration adjustment amount.

In the embodiment shown in FIG. 3, determining the display duration adjustment amount via the degree of association between the notification information and an application currently running on a television, and determining the second display duration according to the type of the operation instruction and the display duration adjustment amount. In this way, a large display duration adjustment amount is set for a notification with a high degree of association with a certain type of applications, allowing the user to adjust the display duration of the notification to an optimal display duration through carrying out operations for just a few times. Regarding a notification with a low degree of association with this type of applications, a small display duration adjustment amount is set, so as to avoid a situation where a user adjusts the display duration of the notification to an inappropriate duration through a few times of operations. For example, assuming that according to an empiric value, the user is not interested in a certain type of notifications under these scenarios, but large display durations may be generated due to a few times of operations of opening notification by the user because large display duration adjustment amounts are set.

Figure 4:
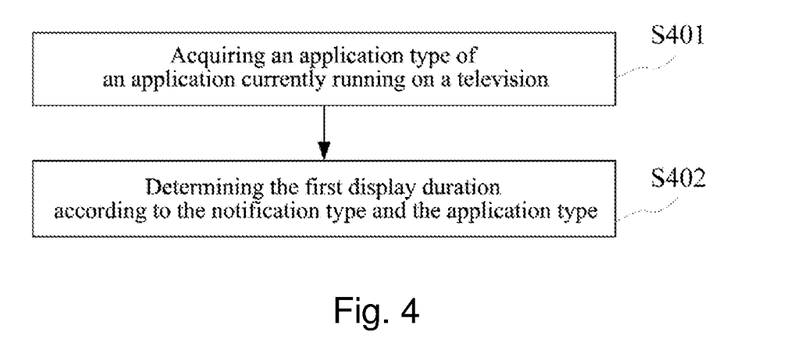
FIG. 4 is a flow diagram of a determination method of a first display duration provided by the present application.

On the basis of any of the above embodiments, the first display duration may be determined according to the notification type of the notification information according to the following feasible implementation (S101 in the embodiment shown in FIG. 1), for which please refer to the embodiment shown in FIG. 4.

Figure 5:
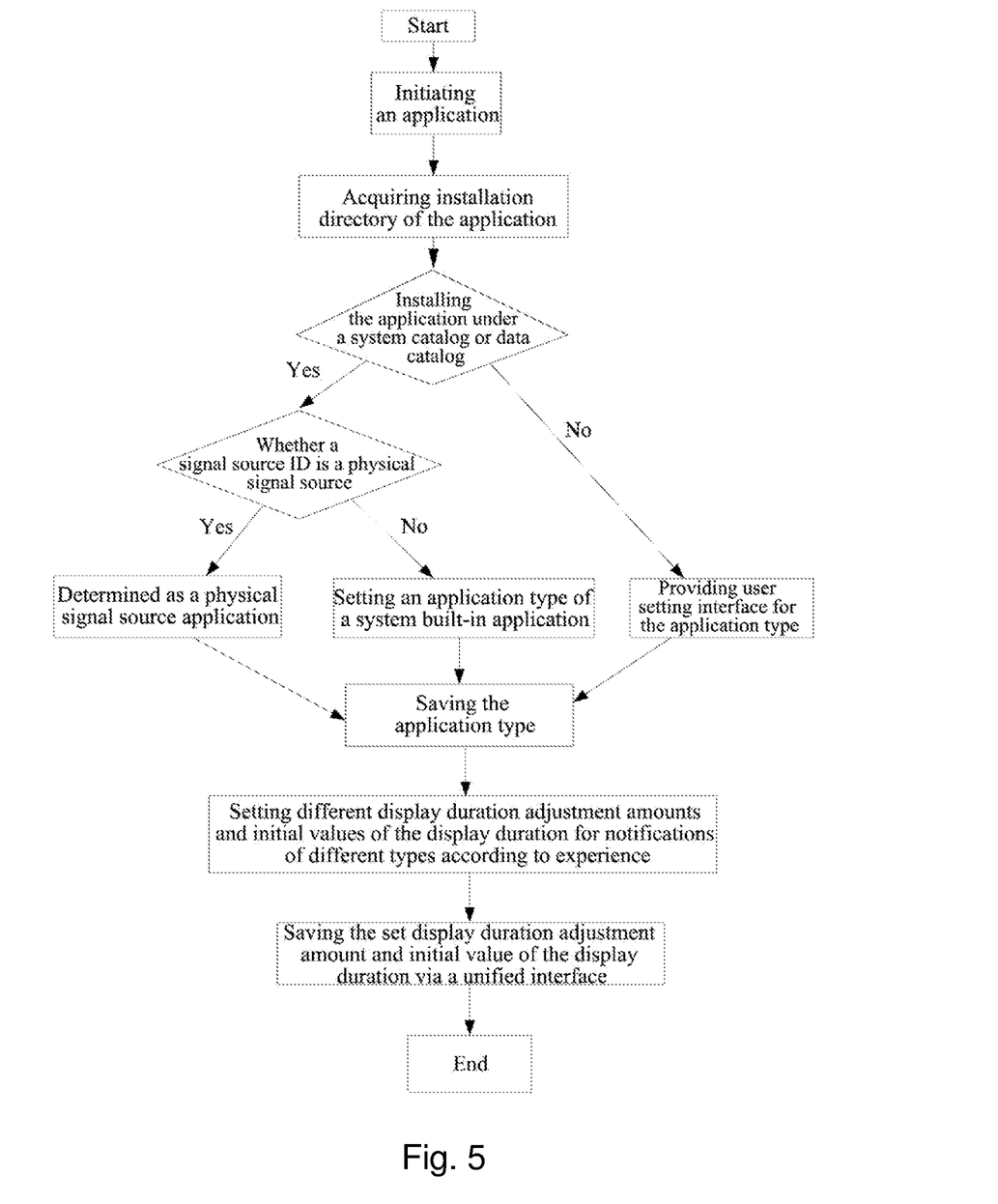
FIG. 5 is a flow diagram for acquiring a notification type and an application type during a method for adjusting television notification display durations in an embodiment of the present application.

FIG. 4 is a flow diagram of a determination method of a first display duration provided by the present application in reference to FIG. 4, and the method may include:

S401, acquiring an application type of an application currently running on a television;

FIG. 5 is a flow diagram for acquiring a notification type and an application type during a method for adjusting television notification display durations in an embodiment of the present application.

In reference to FIG. 5, applications may be classified by a television in advance. For example, the applications may be classified into physical signal source applications, system built-in media applications, system built-in tool applications, system built-in entertainment applications, applications voluntarily installed by the user, etc. The television may, by acquiring physical source identifications (source identifications), determine whether all default applications of a system, such as live television shows, high definition multimedia interfaces (High Definition Multimedia Interface in English, briefly referred to as HDMIs), audios and videos (audios and videos, briefly referred to as AVs), etc., are physical signal source applications; regarding other system built-in applications besides the physical signal sources, the application may automatically set a application type during its initial startup, and may also be defaulted as other applications, as well as save the set application type via a unified manner, for example, a unified interface may be provided through a management module, the application calls the unified interface to set the application type, and transfers the application type data to the management module where the data is saved. Regarding the applications voluntarily installed by the user, the default application type is a third party application, and at the same time, a user interface is provided for the user to freely set the type of the application.

S402, determining the first display duration according to the notification type and the application type.

When the television receives the notification information, the first display duration of the notification information is also related with the application type of the application currently running on a television. When applications of different types are running on the television, the first display durations of the same notification information are different. For example, when an application of a first application type is running on the television, the display duration of the first notification information on the television is duration 1, and when an application of a second application type is running on the television, the display duration of the first notification information on the television is duration 2.

The notification type, and a mapping table between the application type and the first display duration may be stored on a television. In this way, when the first display duration of the received notification information is required to be acquired, the first display duration of the notification information may be acquired according to the notification type of the notification information, the application type of the application currently running on the television, and the mapping table. During practical applications, the first display duration corresponding to the notification type and the application type in the mapping table may be set according to an empiric value, before adjusting the display duration by adopting the method for adjusting television notification display durations provided by embodiments of the present application.

Further, when the number of notifications registered simultaneously is above a preset threshold, and multiple notifications are displayed in a superposed way, a method for dynamically adjusting display priority of the multiple notifications is also provided by an embodiment of the present application on the basis of the above embodiments, in an effort to ensure that notifications the user is concerned for or interested in are able to firstly come into user's sight.

When multiple notifications are displayed in a superposed way, reading display durations of the multiple notifications, and displaying the notification with the longest display duration on the uppermost layer. When the user sends out an operation instruction for opening the notification via a remote control or other input apparatuses, the notifications are opened on a television according to the lengths of the display durations of the multiple notifications. Because the display durations of the multiple notifications are determined according to notification operations by the user via the method for adjusting television notification display durations in the above embodiment, the notification with the longest display duration obtained according to the method is just the one with the highest level of user's interest. Thus by displaying the multiple notifications arranged according to the lengths of the display durations, the user can notice notifications calling for the user's attention or interest at the first sight, without browsing all notifications before picking out notifications the user is concerned for, thus the user will not miss notifications of his concern.

When the number of multiple notifications simultaneously registered is below the preset threshold, the multiple notifications are sequentially displayed on a television screen according to the lengths of the display durations, for example, in the order of from the longest to the shortest.

Figure 6:
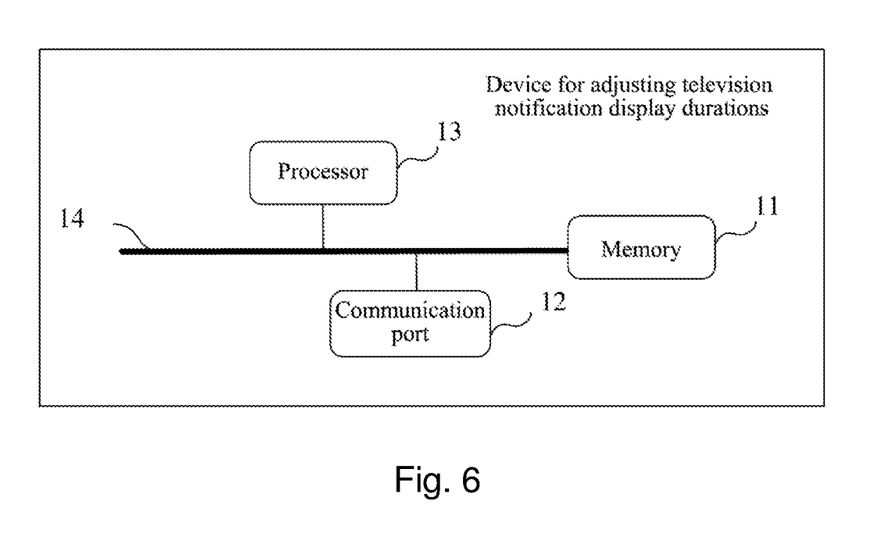
FIG. 6 is a structural diagram of a device for adjusting television notification display durations provided by an embodiment of the present application.

FIG. 6 is a structural diagram of a device for adjusting television notification display durations provided by an embodiment of the present application. In reference to FIG. 6, the device may include a memory 11, a communication port 12, a processor 13, and a communication bus 14, wherein, the memory 11 is configured to store application programs, the processor 13 is coupled with the memory 11, the communication bus 14 is configured to realize communication links among the elements. The processor 13 is configured to execute instructions stored on the memory 11, and the processor 13 is configured to:

receive notification information sent by a server via the communication port, and to determine a first display duration according to a notification type of the notification information;

receive an operation instruction sent by a user regarding the notification information;

adjust the first display duration to a second display duration according to the type of the operation instruction.

A device shown in an embodiment of the present application may execute the technical solutions illustrated in the embodiment of the method, under a similar realization principle and with similar beneficial effects, which will not be repeated herein.

In an implementation, the processor 13 is configured to:
determine a display duration adjustment amount;
determine that the second display duration is a sum of the first display duration and the display duration adjustment amount, if the type of the operation instruction is a notification-opening type;
determine that the second display duration is a difference between the first display duration and the display duration adjustment amount, if the type of the operation instruction is a notification-cancellation type.

In another implementation, the processor 13 is configured to:
acquire an application type of an application currently running on a television;
determine a degree of association between the notification information and the application according to the notification type and the application type;
determine the display duration adjustment amount according to the degree of association.

In another implementation, the processor 13 is configured to:
determine whether the second display duration is below a first preset threshold;
if so, assign the first preset threshold as the second display duration.

In another implementation, the processor 13 is configured to:
determine whether the second display duration exceeds a second preset threshold;
if so, assign the second preset threshold as the second display duration.

In another implementation, the processor 13 is configured to:
acquire an application type of an application currently running on a television;
determine the first display duration according to the notification type and the application type.

A device shown in an embodiment of the present application may execute technical solutions illustrated in the above embodiment of the method, under a similar realization principle and with similar beneficial effects, which will not be repeated herein.

Figure 7:
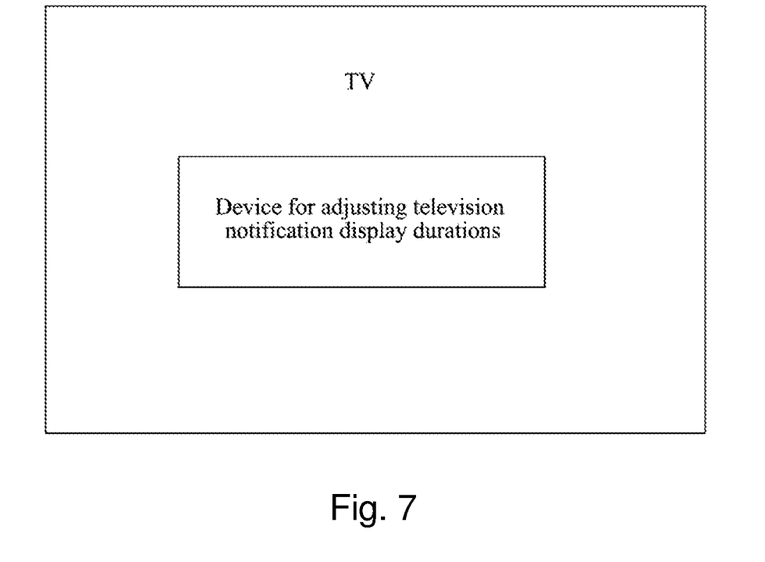
FIG. 7 is a structural diagram of a device for adjusting television notification display durations provided by an embodiment of the present application.

FIG. 7 is a structural diagram of a device for adjusting television notification display durations provided by an embodiment of the present application. In reference to FIG. 7, the television includes a device for adjusting television notification display durations provided by the embodiment in FIG. 6, the television may execute the method for adjusting television notification display durations provided by embodiment 1, under similar realization principle and with similar technical effects relative to embodiment 1, which will not be repeated herein.

One with ordinary skill in the art may understand that, part of or all steps for realizing the foregoing embodiments of the method may be completed through hardware relevant to the program instructions. The above program may be stored in a computer, a handphone or a readable storage medium of other portable devices. Steps including the above embodiments of the method are executed during execution of the program; and the above storage medium includes: ROMs, RAMs, magnetic disks or optical disks and other media capable of storing program codes.

Finally, it should be noted that, the above embodiments are merely meant to illustrate rather than limit the technical solutions of the present application; and although the present application has been concretely described in reference to the above embodiments, one with ordinary skill in the art shall understand that modifications can still be made to the technical solutions recorded in the foregoing embodiments, or that equivalent substitutions can still be made to part or all of the technical features therein; neither these modifications nor these substitutions shall make the essence of the corresponding technical solutions depart from the scope of the technical solutions in the above embodiments of the present application.

What is claimed is:

1. A method for adjusting television notification display durations used in a television system, comprising:
receiving, by the television, a first notification information sent by a server, and determining a first display duration corresponding to a notification type of the first notification information, wherein the first display duration is the duration when the first notification information is displayed on a screen of the television;
receiving, by the television, an operation instruction given by a user regarding the first notification information;
adjusting, by the television, the first display duration corresponding to the notification type to a second display duration for a second notification information independently received from the server subsequent to and having the same type with the first notification information according a type of the operation instruction, wherein the second display duration is the duration when the second notification information is being displayed on the screen of the television and different from the first display duration.

2. The method according to claim 1, wherein the adjusting the first display duration corresponding to the notification type to a second display duration for a second notification information independently received from the server subsequent to and having the same type with the first notification information according a type of the operation instruction comprises:

determining, by the television, a display duration adjustment amount;
determining, by the television, that the second display duration is a sum of the first display duration and the display duration adjustment amount, if the type of the operation instruction is a notification-opening type;
determining, by the television, that the second display duration is a difference between the first display duration and the display duration adjustment amount, if the type of the operation instruction is a notification-cancellation type.

3. The method according to claim 2, wherein the determining, by the television, a display duration adjustment amount comprises:
acquiring, by the television, an application type of an application currently running on a television;
determining, by the television, a degree of association between the first notification information and the application according to the notification type of the first notification information and the application type;
determining, by the television, the display duration adjustment amount according to the degree of association.

4. The method according to claim 3, wherein the determining, by the television, the display duration adjustment amount according to the degree of association comprises:
determining, by the television, the display duration adjustment amount according to a corresponding relation between the display duration adjustment amount and the degree of association, wherein the corresponding relation is preset on the television or set as practically needed, and wherein the degree of association represents the level of interest of a user towards a notification displayed on the application when the application is running, in which the higher the degree of association between the notification information and the application, the larger the display duration adjustment amount.

5. The method according to claim 1, wherein the adjusting the first display duration corresponding to the notification type to a second display duration for a second notification information independently received from the server subsequent to and having the same type with the first notification information according a type of the operation instruction comprises:
determining, by the television, whether the second display duration is less than a first preset threshold;
if so, assigning the first preset threshold as the second display duration.

6. The method according to claim 1, wherein, the adjusting the first display duration corresponding to the notification type to a second display duration for a second notification information independently received from the server subsequent to and having the same type with the first notification information according a type of the operation instruction comprises:
determining, by the television, whether the second display duration exceeds a second preset threshold;
if so, assigning the second preset threshold as the second display duration.

7. The method according to claim 1, wherein the determining a first display duration corresponding to the notification type of the first notification information comprises:
acquiring, by the television, an application type of an application currently running on the television;
determining, by the television, the first display duration corresponding to the notification type of the first notification information and the application type.

8. The method according to claim 7, wherein the determining the first display duration corresponding to the notification type of the first notification information and the application type comprises:
determining, by the television, the first display duration according to a corresponding relation between the notification type of the first notification information and the first display duration, wherein the corresponding relation is preset on the television or set as practically needed.

9. A device for adjusting television notification display durations used in a television system, comprising a memory, a communication port and a processor, wherein the memory is configured to store instructions, the processor is coupled with the memory and is configured to execute the instructions stored on the memory, and the processor is configured to:
receive a first notification information sent by a server via the communication port, and determine a first display duration corresponding to a notification type of the first notification information, wherein the first display duration is the duration when the first notification information is displayed on a screen of the television;
receive an operation instruction sent by a user regarding the first notification information;
adjust the first display duration corresponding to the notification type to a second display duration for a second notification information independently received from the server subsequent to and having the same type with the first notification information according a type of the operation instruction, wherein the second display duration is the duration when the second notification information is displayed on the screen of the television and different from the first display duration.

10. The device according to claim 9, wherein the processor is configured to:
determine a display duration adjustment amount;
determine that the second display duration is a sum of the first display duration and the display duration adjustment amount, if the type of the operation instruction is a notification-opening type;
determine that the second display duration is a difference between the first display duration and the display duration adjustment amount, if the type of the operation instruction is a notification-cancellation type.

11. The device according to claim 10, wherein the processor is configured to:
acquire an application type of an application currently running on a television;
determine a degree of association between the first notification information and the application according to the notification type of the first notification information and the application type;
to determine the display duration adjustment amount according to the degree of association.

12. The device according to claim 11, wherein the processor is configured to:
determine the display duration adjustment amount according to a corresponding relation between the display duration adjustment amount and the degree of association, wherein the corresponding relation is preset on the television or set as practically needed, and wherein the degree of association represents the level of interest of a user towards a notification displayed on the application when the application is running, in which the higher the degree of association between the notification information and the application, the larger the display duration adjustment amount.

13. The device according to claim 9, wherein the processor is configured to:
   determine whether the second display duration is less than a first preset threshold;
   if so, assign the first preset threshold as the second display duration.

14. The device according to claim 9, wherein the processor is configured to:
   determine whether the second display duration exceeds a second preset threshold;
   if so, assign the second preset threshold as the second display duration.

15. The device according to claim 9, wherein the processor is configured to:
   acquire an application type of an application currently running on the television; and
   determine the first display duration corresponding to the notification type of the first notification information and the application type.

16. The device according to claim 15, wherein the processor is configured to:
   determine the first display duration according to a corresponding relation between the notification type of the first notification information and the first display duration, wherein the corresponding relation is preset on the television or set as practically needed.

17. A television, comprising the device for adjusting television notification display durations according to claim 9.

* * * * *